Figure 1:
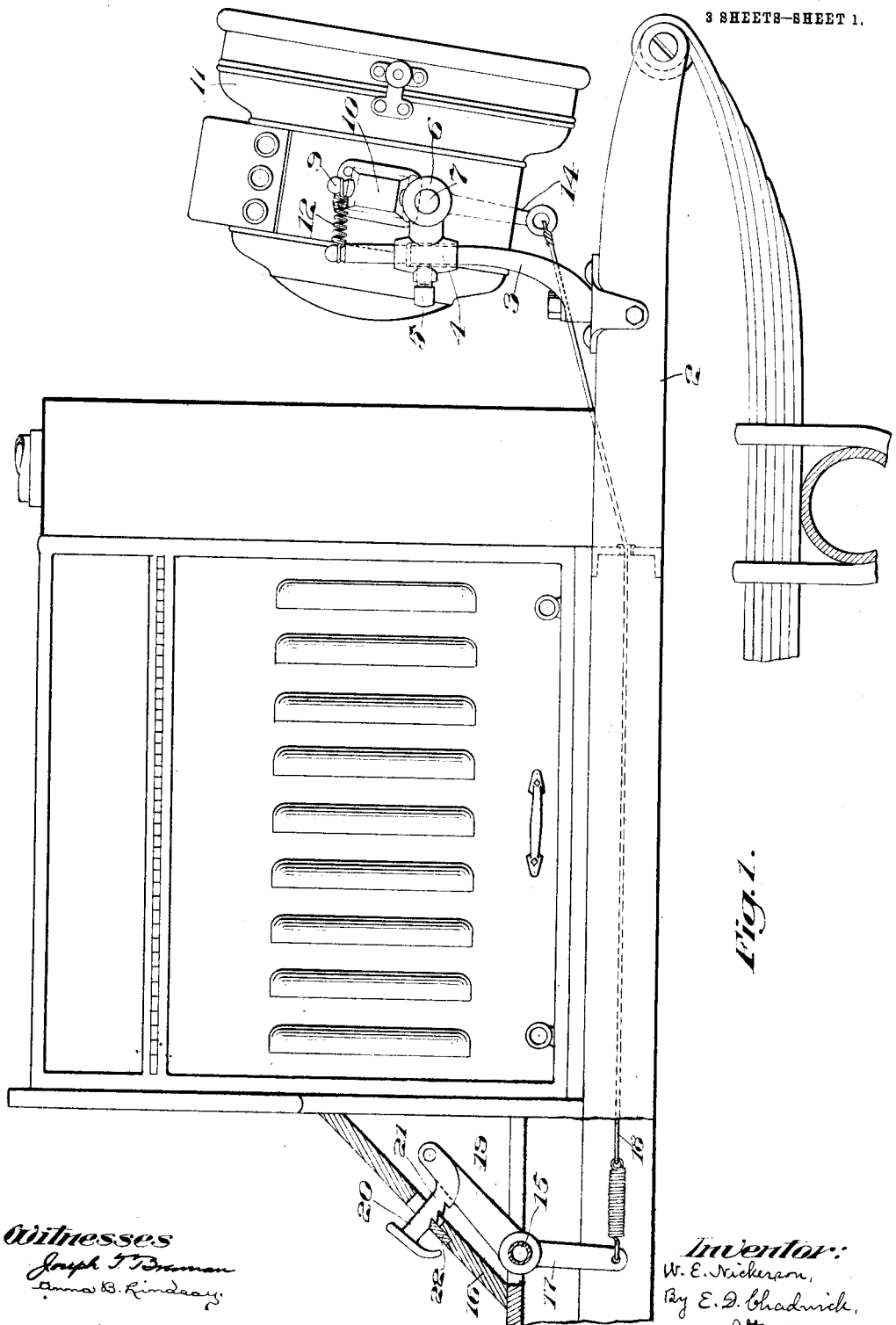

W. E. NICKERSON.
MOUNTING FOR AUTOMOBILE HEADLIGHTS.
APPLICATION FILED JUNE 16, 1911.

1,089,430.

Patented Mar. 10, 1914.
3 SHEETS—SHEET 1.

Witnesses
Joseph T. Brennan
Anna B. Lindsay

Inventor:
W. E. Nickerson,
By E. D. Chadwick,
Attorney.

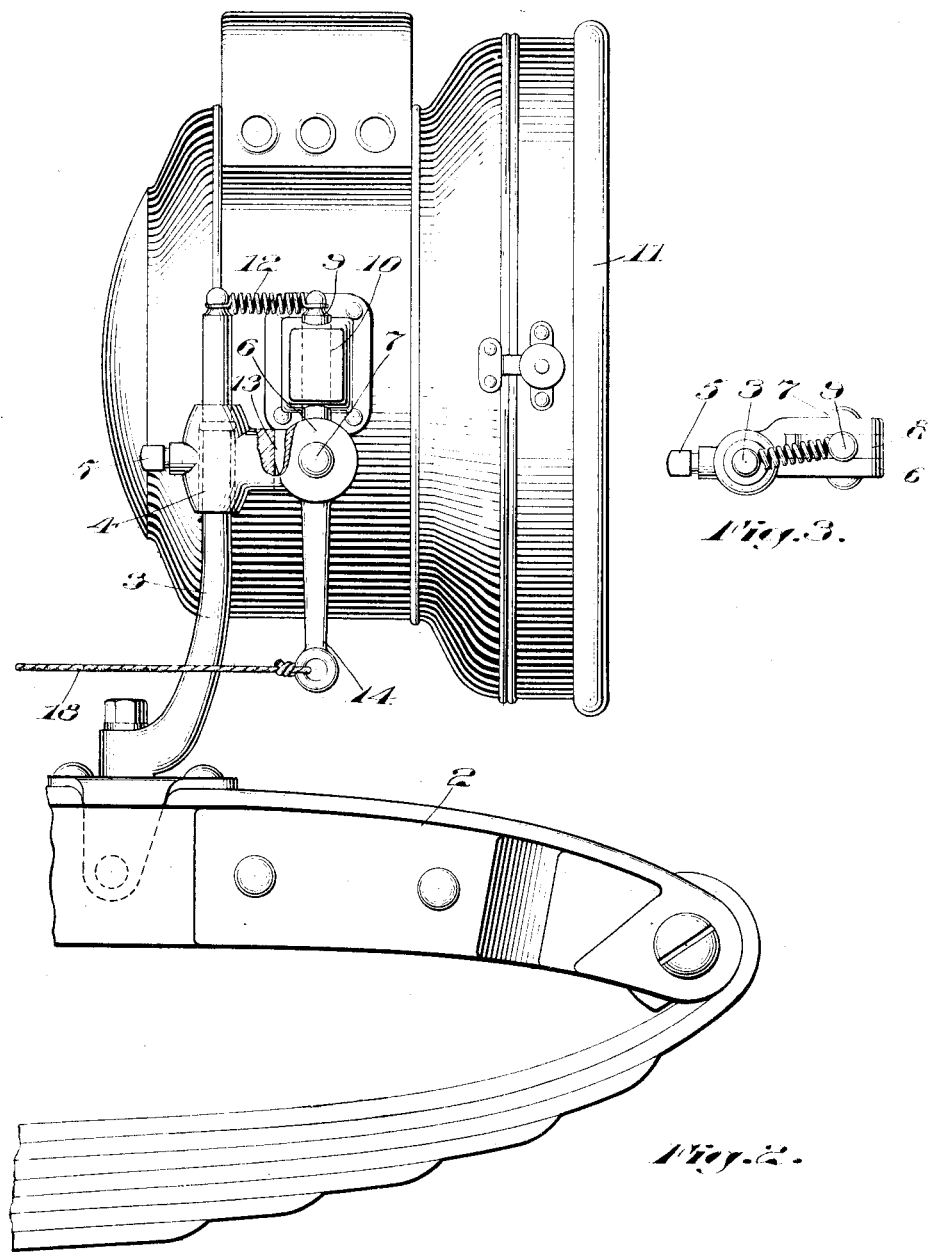

W. E. NICKERSON.
MOUNTING FOR AUTOMOBILE HEADLIGHTS.
APPLICATION FILED JUNE 16, 1911.

1,089,430.

Patented Mar. 10, 1914.
3 SHEETS—SHEET 3.

Witnesses
Joseph T. Brown
Anna B. Lindsay

Inventor:
W. E. Nickerson,
By E. D. Chadwick,
Attorney.

UNITED STATES PATENT OFFICE.

WILLIAM E. NICKERSON, OF CAMBRIDGE, MASSACHUSETTS, ASSIGNOR TO EVERETT D. CHADWICK, TRUSTEE, OF WINCHESTER, MASSACHUSETTS.

MOUNTING FOR AUTOMOBILE-HEADLIGHTS.

1,089,430.  Specification of Letters Patent.  Patented Mar. 10, 1914.

Application filed June 16, 1911.  Serial No. 633,565.

*To all whom it may concern:*

Be it known that I, WILLIAM E. NICKERSON, a citizen of the United States, residing at Cambridge, in the county of Middlesex and State of Massachusetts, have invented new and useful Improvements in Mountings for Automobile-Headlights, of which the following is a specification.

It is a well-recognized objection to the powerful headlights used on various self-propelled road vehicles, such as electric cars and automobiles, that to a person approaching such a headlight from in front of the same practically nothing is visible except the light itself, all objects adjacent to and behind the light being obscured by the intense glare, so that the passing of two automobiles in opposite directions at night is attended not only with difficulty but also with the danger of running off the road-bed or into persons or obstructions in the road-bed behind the approaching cars. The same difficulty and danger are involved in the passing of an automobile and an electric car, and have become so serious that in some places the use of such headlights has been subjected to regulation by statute or municipal ordinance, or prohibited altogether unless provision is made for doing away with the objectionable glare of the same at will.

My invention is intended to provide a simple and efficient arrangement for accomplishing the result just referred to without losing the benefit of the illumination of the road-bed, and is characterized by the employment, in combination with the vehicle and its headlight, of mountings for the headlight located on opposite sides of the same, and having pivotal axes which extend horizontally and transversely to the length of the vehicle, or substantially so, in such manner that the light can be arranged to throw its rays forward in the usual manner, or tilted to throw its rays downward upon the road-bed immediately in front of the vehicle, as desired. When the headlight is so tilted the road-bed is still illuminated in front of the car but the path of the rays of light is so changed that although the flame itself may be visible to a person approaching the vehicle from in front, such person is not exposed to the direct glare of the light, so that the vehicle and the objects behind and adjacent to it remain visible and all danger or difficulty in passing the car is obviated. Thus the illumination produced by the headlight, instead of being a source of danger, becomes of actual assistance because, being thrown directly upon the road-bed itself, the road-bed becomes highly illuminated directly in front of the vehicle, and the resulting illumination of adjacent objects by the light reflected from the road-bed assists in making them visible.

My invention is herein illustrated and described as applied to an automobile having a pair of headlights according to the usual practice, and as one of the features of my invention I have devised a mounting for the headlights which is in the form of an attachment adapted to be applied to the usual standards which carry the headlights of existing automobiles, without alteration either of the standards themselves or of the headlights, this embodiment of my invention, as preferably constructed, being illustrated in the accompanying drawings, in which—

Figure 4:
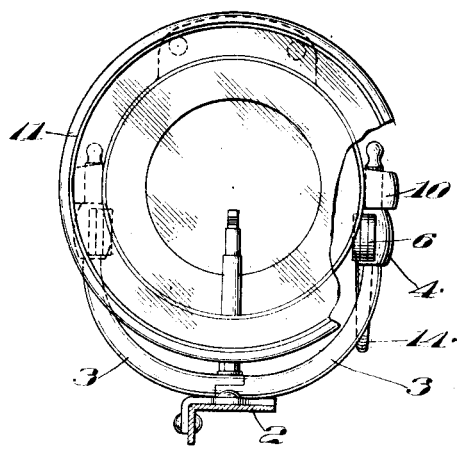
Figure 5:
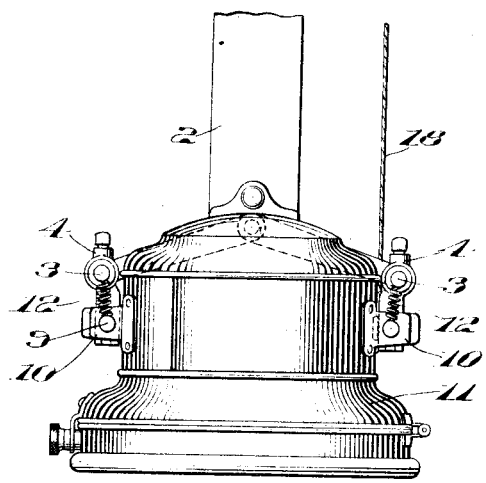

Figure 1 is a side elevation, partly in section, of so much of the front portion of an automobile as includes the headlights and their mountings, together with means for tilting the headlights; Fig. 2 is a similar view showing one of the headlights on a larger scale; Fig. 3 is a plan view showing a detail; Fig. 4 is a front view of the headlight and the adjacent parts, partly broken away; and Fig. 5 is a top plan view of the parts shown in Fig. 4.

In the drawings but one headlight is illustrated, the construction and mounting of the other headlight being identical, so that the description of one will serve for both.

Referring to the drawings, 2 indicates one of the frames of the chassis and 3, 3, indicate a pair of upright standards secured to and projecting upward from the frame 2 near its front end in the well known manner. On each of these standards 3 is mounted a bracket 4 which is clamped thereon by means of a set screw 5 and has a forwardly-projecting portion 6 carrying a pivot rod 7 extending horizontally and transversely with respect to the length of the car, the two brackets 4 being so adjusted on the standards 3 that the corresponding rods 7 are in axial alinement with each other. On each of the rods 7 is pivotally mounted a hub 8, Fig. 3, from which a standard 9 extends upward, said standard having the same size and shape as the upper portion of the adjacent standard 2, so that it is adapted to pass upward through the usual supporting bracket 10 carried by the corresponding side of the headlight 11 and to support the same at the usual elevation. Each hub 8 is preferably located in a vertically-extending recess formed in the front end of its bracket 4, as shown in Fig. 3, and a spring 12 connects the upper ends of the corresponding standards 2 and 9, whereby the standards 9 are normally maintained in the vertical position, each standard being prevented from moving backward beyond this position by means of a suitable stop which is represented as consisting of a flat face formed on the hub 8 and adapted to abut against the rear wall of the recess in which said hub moves, as shown at 13 in Fig. 2.

With the parts constructed and arranged as above described, the headlights 11 are adapted to be turned on the horizontal axes on which they are mounted in such manner as to throw the rays of light downward upon the road-bed immediately in front of the car, as indicated in Fig. 1, and, in order that this may be readily accomplished by the driver from his seat I provide suitable operating connections preferably consisting of an arm 14 connected to one of the hubs 8 of each headlight and extending downward therefrom, and a rock shaft 15 mounted beneath the footboard 16 and provided with a downwardly-extending arm 17 connected by a flexible cord or wire 18 to the lower end of the corresponding arm 14, said rock shaft being also provided with an upwardly-extending arm 19 to which is pivoted a treadle 20 passing through an aperture in the footboard and provided with means for locking it in its depressed position, such as a series of notches 21 adapted to receive the edge of a locking plate 22, Fig. 1. It will be understood that the cords 18 corresponding to the two headlights are both connected to the same rock shaft 15, so that whenever the treadle 20 is depressed and locked in the position shown in Fig. 1 said cords 18 will be drawn backward and will therefore tilt the headlights on their pivotal axes and thus throw the light downward upon the road-bed as already described, the springs 12 being simultaneously extended. To restore the headlights to their normal position the outer end of the treadle 20 is pressed forward, thus disengaging the treadle from the locking plate 22, whereupon the springs 12 draw the upper ends of the standards 9 backward into vertical position.

It will be observed that inasmuch as the two brackets 4 corresponding to each headlight are entirely separate and distinct from each other the attachment above described may be applied to any pair of standards 3, regardless of their distance apart, and inasmuch as such standards are now made of uniform size to a considerable extent, in correspondence with the various makes of headlights, a few different sizes of my attachment will suffice for practically all types and makes of automobiles. The pivotal mountings for the headlights may, however, be incorporated in the headlight supports of a car when originally built, if desired, and the means for tilting the headlights may be widely varied, without departing in either case from my invention, which is also applicable to electric street cars and in fact to any vehicle in the use of which it is desirable to obviate the above-described disadvantages due to the use of a powerful headlight.

I claim as my invention:—

1. An attachment for automobiles comprising a pair of brackets adapted to be supported respectively by the usual headlight standards, supplementary upright standards carried by said brackets and mounted to turn on alined horizontal pivots, and means for turning the latter standards on said pivots.

2. An attachment for automobiles comprising a pair of brackets adapted to be supported respectively by the usual headlight standards, said brackets being provided with supplementary upright standards adapted to support the headlight and mounted to turn on transversely-extending horizontal pivots, springs tending to maintain the supplementary standards in vertical position, and means for tilting the latter standards and the headlight carried thereby on said pivots.

3. An attachment for automobiles comprising a pair of independent brackets having vertical perforations adapted to receive the usual headlight standards, supplementary standards carried by said brackets respectively and adapted to enter the perforated supports on the sides of the headlight, said supplementary standards being mounted on alined transversely-extending pivots, springs connecting the upper ends of the standards on each side of the headlight, an arm connected to one of the supplementary standards and extending downward therefrom, and means for drawing said arm backward to tilt the headlight on said pivots.

4. The combination with an automobile having a pair of upright headlight-carrying standards, of a bracket mounted on each standard, a supplementary standard carried by each bracket and mounted to rock on a transversely-extending pivot, a headlight mounted on said pair of supplementary standards, springs connecting the upper ends of the standards on each side of the headlight, and means for tilting the headlight to throw its rays forward and downward on the road-bed.

5. The combination with an automobile having a pair of upright headlight-carrying standards, of a bracket mounted on each standard, a supplementary standard carried by each bracket and mounted to rock on a transversely-extending pivot, a headlight mounted on said pair of supplementary standards, springs connecting the upper ends of the standards on each side of the headlight, and means for tilting the headlight to throw its rays forward and downward on the road-bed, comprising an arm connected to the supplementary standards and extending downward therefrom, a rock-shaft, connections between the rock-shaft and said downwardly-extending arm, and a treadle accessible from the driver's seat for operating said rock-shaft.

6. The combination with an automobile having a pair of upright headlight-carrying standards, of a bracket mounted on each standard, a supplementary standard carried by each bracket and mounted to rock on a transversely-extending pivot, a headlight mounted on said pair of supplementary standards, springs connecting the upper ends of the standards on each side of the headlight, and means for tilting the headlight to throw its rays forward and downward on the road-bed, comprising an arm connected to the supplementary standards and extending downward therefrom, a rock-shaft, connections between the rock-shaft and said downwardly-extending arm, and a treadle accessible from the driver's seat for operating said rock-shaft, said treadle being pivotally connected to the rock-shaft and provided with notches adapted to receive the edge of a locking plate.

In testimony whereof, I have hereunto subscribed my name this fourteenth day of June, 1911.

WILLIAM E. NICKERSON.

Witnesses:
  E. D. CHADWICK,
  JOSEPH T. BRENNAN.